(12) United States Patent
Horie et al.

(10) Patent No.: US 6,968,376 B2
(45) Date of Patent: Nov. 22, 2005

(54) HOME GATEWAY APPARATUS

(75) Inventors: Hiromitsu Horie, Kawasaki (JP); Yuji Tarui, Kawasaki (JP); Katsuyoshi Otsu, Kawasaki (JP); Kazuhito Takashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 766 days.

(21) Appl. No.: 10/101,356

(22) Filed: Mar. 20, 2002

(65) Prior Publication Data
US 2003/0041137 A1 Feb. 27, 2003

(30) Foreign Application Priority Data
Aug. 24, 2001 (JP) .............................. 2001-253979

(51) Int. Cl.⁷ .......................................... G06F 15/173
(52) U.S. Cl. ..................................... 709/224; 709/249
(58) Field of Search ................................ 709/223, 224, 709/249

(56) References Cited

U.S. PATENT DOCUMENTS

| | | | |
|---|---|---|---|
| 4,567,557 A * | 1/1986 | Burns ........................... | 700/16 |
| 6,453,687 B2 * | 9/2002 | Sharood et al. ................ | 62/127 |
| 6,496,575 B1 * | 12/2002 | Vasell et al. ........... | 379/102.05 |
| 6,853,291 B1 * | 2/2005 | Aisa ............................. | 340/3.3 |
| 2002/0013723 A1 * | 1/2002 | Mise .............................. | 705/8 |
| 2002/0037004 A1 * | 3/2002 | Bossemeyer et al. ........ | 370/356 |
| 2002/0063633 A1 * | 5/2002 | Park ........................ | 340/825.69 |
| 2002/0069276 A1 * | 6/2002 | Hino et al. ................... | 709/223 |
| 2002/0095269 A1 * | 7/2002 | Natalini et al. .............. | 702/188 |
| 2002/0165953 A1 * | 11/2002 | Diong .......................... | 709/224 |
| 2003/0018733 A1 * | 1/2003 | Yoon et al. .................. | 709/208 |
| 2003/0101459 A1 * | 5/2003 | Edson .......................... | 725/82 |
| 2004/0059815 A1 * | 3/2004 | Buckingham et al. ...... | 709/224 |

FOREIGN PATENT DOCUMENTS

| | | |
|---|---|---|
| JP | 7-212361 | 8/1995 |
| JP | 2000-357146 | 12/2000 |

OTHER PUBLICATIONS

PR Newswire, "Xanboo™ Develops Residential Gateway Application for Remote Home Control and Monitoring," Jan. 16, 2001, PR Newswire, pp. 1ff.*

(Continued)

*Primary Examiner*—Bradley Edelman
(74) *Attorney, Agent, or Firm*—Staas & Halsey LLP

(57) ABSTRACT

A home gateway apparatus connected to intra-home terminal devices in a home network, has external interfaces to external terminals; internal interfaces to the intra-home terminal devices; a management table memory having management information to be sent and a destination address of the intra-home terminal devices; a management information memory to store the acquired management information; and a management information control unit to send the management information to the external terminal, based on the destination address stored in the management table, after acquiring the management information of the terminal device based on the management information to be sent stored in the management table. The home gateway apparatus can freely select a sending mode of the management information for every intra-home terminal devices, by setting the management table. Therefore, the gateway apparatus having an advanced versatility can be provided.

15 Claims, 7 Drawing Sheets

OTHER PUBLICATIONS

Keefe, "The Internet's Major Players Are Betting the 'Residential Gateway'—a VCR-sized Box that Links Computers, Appliances, Heating and Cooling, Stereos and TVs—Will Become Your Home's," Nov. 3, 2000, Austin American Statesman, p. H.1.*

Honda et al., "An Optimized Gateway Controller for HA System and Automatic Meter Reading System," Aug. 1991, IEEE Transactions on Consumer Electronics, vol. 37, Iss. 3, pp. 388-394.*

Koji et al., JPO Website Translation of JP Patent No. 07-212361.*

Michiaki et al., JPO Website Translation of JP Patent No. 2000-357148.*

* cited by examiner

FIG. 3

MANAGEMENT TABLE

| PORT No. | | DESIGNATION ADDRESS | MANAGER ACCESS ID | PASSWORD | EXTERNAL I/F | INTERNAL I/F | SEND OPERATION | SEND INTERVAL | MANAGEMENT INFORMATION ACQUIRE INTERVAL | SEND LEVEL |
|---|---|---|---|---|---|---|---|---|---|---|
| 1 | 1 | aaa@A.com | 1234 | **** | ADSL | IEEE1394 | YES | 24 HOURS | 1 HOUR | 1 |
| 1 | 2 | bbb@B.com | aaaa | **** | ADSL | IEEE1394 | YES | 24 HOURS | 30 MIN. | 0,1,2 |
| 2 | 1 | ccc@X.co.jp | abcd | **** | TEL | 10BASET | YES | 12 HOURS | 10 MIN. | 0,1 |
| 2 | 2 | 090-1234-5678 | — | — | TEL | 10BASET | NO | — | — | 2 |
| .. | .. | .. | .. | .. | .. | .. | .. | .. | .. | .. |
| n | 1 | aaa@A.com | 4321 | **** | ADSL | WIRELESS LAN | YES | 24 HOURS | 1 HOUR | 0,1 |
| .. | .. | .. | .. | .. | .. | .. | .. | .. | .. | .. |

FIG. 4

| MODEL OF DEVICE | | SENDING LEVEL | | STATUS/REQUEST | | ADDITIONAL INFORMATION |
|---|---|---|---|---|---|---|
| CODE | DEVICE | CODE | CONTENT | CODE | CONTENT | |
| 1 | PC | 0 | LEVEL FOR IMMEDIATE SENDING | 0 | HARD DISK ERROR | — |
| | | | | 1 | MEMORY ERROR | — |
| | | | | 2 | OTHER ERRORS | — |
| | | | | .. | .. | .. |
| | | 1 | LEVEL FOR SENDING AT SET INTERVAL | 0 | NORMAL RUNNING | — |
| | | | | 1 | ACCUMLATIVE USE TIME | H |
| | | | | 2 | CONTINUOUS USE TIME | H |
| | | | | .. | .. | .. |
| | | 2 | LEVEL FOR SENDING WHEN REQUESTED | 0 | SERIAL NO. | xxxxx |
| | | | | 1 | MODEL NAME / NO. | yyyyy |
| | | | | 2 | RESOURCE STATE | % |
| | | | | .. | .. | .. |
| 2 | MICRO WAVE OVEN | 0 | LEVEL FOR IMMEDIATE SENDING | 0 | TEMPERATURE ABNORMAL | — |
| | | | | 1 | ABNORMAL VOLTAGE | — |
| | | | | 2 | OTHER ERRORS | — |
| | | | | .. | .. | .. |
| | | 1 | LEVEL FOR SENDING AT SET INTERVAL | 0 | NORMAL RUNNING | — |
| | | | | 1 | ACCUMLATIVE USE TIME | H |
| | | | | 2 | CONTINUOUS USE TIME | H |
| | | | | .. | .. | .. |
| | | 2 | LEVEL FOR SENDING WHEN REQUESTED | 0 | SERIAL NO. | xxxxx |
| | | | | 1 | MODEL NAME / NO. | zzzzz |
| | | | | .. | .. | .. |
| 3 | TV | 0 | LEVEL FOR IMMEDIATE SENDING | 0 | DISPLAY ERROR | — |
| | | | | 1 | SENSOR ERROR | — |
| | | | | 2 | TEMPERATURE ABNORMAL | — |
| | | | | .. | .. | .. |
| | | .. | .. | .. | .. | .. |
| .. | .. | | | | | |

FIG. 5

MANAGEMENT INFORMATION

| PORT No. | DESTINATION | ACQUIRED INFORMATION |||| ACQUIRED TIME |
|---|---|---|---|---|---|---|
| | | MODEL CODE | SEND LEVEL CODE | STATUS/ REQUEST CODE | ADDITIONAL INFORMATION | |
| 1 | 1 | 1 | 1 | 0 | — | 2001/1/25 17:00 |
| | | 1 | 1 | 1 | 100 H | 2001/1/25 17:00 |
| | | 1 | 1 | 2 | 5 H | 2001/1/25 17:00 |
| | | 1 | 1 | 0 | — | 2001/1/25 18:00 |
| | | 1 | 1 | 1 | 101 H | 2001/1/25 18:00 |
| | | 1 | 1 | 2 | 6 H | 2001/1/25 18:00 |
| | | .. | .. | .. | .. | .. |
| | 2 | 1 | 1 | 0 | — | 2001/1/25 18:30 |
| | | 1 | 1 | 1 | 101.5 H | 2001/1/25 18:30 |
| | | 1 | 0 | 0 | — | 2001/1/25 18:30 |
| | | 1 | 1 | 2 | 6.5H | 2001/1/25 18:30 |
| | | 1 | .. | .. | .. | .. |
| 2 | 1 | 3 | 1 | 0 | 0 | 2001/1/25 19:30 |
| .. | | 3 | .. | .. | .. | .. |
| 3 | 1 | .. | .. | .. | .. | .. |

HOME GATEWAY APPARATUS

BACKGROUND OF THE INVENTION

1. Field of the Invention

The present invention relates generally to a home gateway apparatus which is a gateway to the Internet or other external networks from a plurality of terminal devices for domestic use, and more particularly, to a home gateway apparatus having an improved versatility so that a control of acquisition and transmission of management information can be made flexibly between a plurality of in-home terminal devices and a plurality of manager terminals on the external networks.

2. Description of the Related Art

For recent years, network household electrical appliances have been proposed as household electrical equipment that can be connected to networks. Thus, it will be possible to construct a network system by connecting the household electrical equipment to in-home or out-home networks, by installing a function to send or receive a variety of information with connection to networks to the household electrical equipment.

As for the domestic use electrical equipment having such a communication function, it will be possible to acquire necessary management information or to give a necessary operation command, getting direct access to the domestic use electrical equipment, from a portable terminal away from home or a terminal device at a distant location. In addition, it will also be possible for domestic use electrical equipment having a trouble to send specific trouble information to the terminal of a support company at a distant location by itself, asking for repair automatically.

For instance, in Japan Patent Laid-open Pub. No. 2000-7146, it is proposed that a refrigerator, air conditioner or other domestic use electrical equipment connected to a home network sends its operating information to a mail server through the Internet, so that a user away from home can acquire the operating information stored in the mail server using his or her portable terminal.

As for domestic use electrical equipment to be connected to a home network (hereinafter referred to as "intra-home terminal device" so as to mean a terminal within a home network), the maker of each electrical equipment is different, and the interface for each of these domestic use electrical equipment is also different. If an attempt is made to allow the domestic use electrical equipment to send the management information during operation to a maintenance or support company, using its communication function, the maintenance company or support company is not identical corresponding to different makers of the domestic use electrical equipment, thereby resulting in different destination of the management information to be sent and different interface. Further, the management information to be sent can be of various kinds, depending on the domestic use electrical equipment.

Generally, it will be a heavy burden for domestic use electrical equipment, which is severely restricted by cost, to directly communicate to an external network independently. Therefore, a proposal is being made to provide a common home gateway apparatus for all domestic use electrical equipment within a house and to communicate to an external network via the gateway apparatus.

However, this proposal has not been made specific, and any proposal has not been made as to the specific configuration of the home gateway apparatus for a plurality of domestic use electrical equipment. The development of a home gateway apparatus with an advanced versatility is being demanded so that the gateway apparatus can keep the match with a plurality of domestic use electrical equipment that have been developed up to now, while it can ensure the match with a plurality of domestic use electrical equipment that are expected to be developed in the future.

SUMMARY OF THE INVENTION

It is therefore an object of the present invention is to provide a home gateway apparatus with advanced versatility, that can flexibly perform a control of an acquisition and transmission of a management information between a plurality of intra-home terminal devices and a plurality of manager terminals on a network.

Another object of the present invention is to provide a home gateway apparatus that can flexibly control an acquisition of the internal information of a plurality of intra-home terminal devices within a home network and control a transmission of the information to a manager terminal on an external network.

In order to achieve the above objects, according to an aspect of the present invention there is provided a home gateway apparatus connected via ports to a plurality of intra-home terminal devices installed in a home network, the home gateway apparatus comprising an external interface unit to a plurality of external terminals on an external network; and an internal interface unit to the plurality of intra-home terminal devices on the home network. The home gateway apparatus further comprises (1) a management table memory to store, corresponding to port numbers, at least management information to be sent and a sending destination address of the intra-home terminal devices connected to the ports; (2) a management information memory to store, corresponding to the port numbers and the sending destination addresses, the management information of the intra-home terminal devices acquired from the intra-home terminal device, according to a management table stored in the management table memory; and (3) a management information control unit for acquiring the management information of the intra-home terminal device connected to each port to store the acquired management information in the management information memory, according to the target management information stored in the management table, and sending a specified management information to the external terminal, based on the sending destination address stored in the management table.

According to the present invention, the home gateway apparatus can freely select a sending mode of the management information for every intra-home terminal device, only by setting a management table having the management information to be sent, and the sending destination addresses, etc. in the memory, corresponding to the intra-home terminal devices (domestic use electrical equipment) to be connected. Therefore, the gateway apparatus having an advanced versatility can be offered.

According to a preferred embodiment of the present invention, the management table memory stores the external interface information to the external terminal and the internal interface information to the intra-home terminal device, corresponding to the port numbers. By this function, the home gateway apparatus can send or receive information between a different intra-home terminal devices and an external terminals.

Moreover, according to a preferred embodiment, the management table memory stores the timing information for acquiring the management information from the intra-home terminal device, corresponding to the port numbers. Therefore, the home gateway apparatus can acquire the management information in an optimum timing for different intra-home terminal devices. Further, the acquiring timing differs depending on the management information to be acquired. By this feature, the home gateway apparatus can acquire the management information in a different optimum timing for every management information, even if the same intra-home terminal device.

Further, according to a preferred embodiment, the management table memory stores the timing information for sending the acquired management information to an external terminal, depending on the port numbers. Therefore, the home gateway apparatus can send the management information to an external terminal in an optimum timing for different intra-home terminal device. In addition, the sending timing differs depending on the acquired management information. By this feature, the home gateway apparatus can send the management information to an external terminal in an optimum timing that differs depending on the management information.

In the embodiment as described above, the sending timing differs depending on the destination external terminal and the acquired management information. By this feature, the home gateway apparatus allows a different optimum sending timing to be set depending on what management information is to be sent to what external terminal.

In the preferred embodiment, the management information includes model information of the intra-home terminal device, sending level information indicative of the sending mode, and state information of the intra-home terminal device, and the management information control unit sends the information to the sending destination address contained in the management table, depending on the sending level information.

The sending level information is not only the information corresponding to the management information acquired from a terminal device, but also the information indicating the processing type of sending concerning the timing of sending. In other words, as a degree of urgency to send information to an external manager terminal differs depending on the management information, if the management information is set in advance, corresponding to the sending level, the sending level information will specify the management information to be acquired, and further specify the processing type of sending. And, if the management information includes the sending level information, the home gateway apparatus can specify the processing type of sending, referring to the sending level contained in the acquired management information. Therefore, the home gateway apparatus can be flexibly ready for the individual management type of household terminal devices.

BRIEF DESCRIPTION OF THE DRAWINGS

FIG. 3 is a chart showing an example of a management table for an intra-home terminal device;

FIG. 4 is a chart showing an example of code list;

FIG. 5 is a chart showing an example of the management information, that a home gateway apparatus acquired and stored in a management information memory 14;

DESCRIPTION OF THE PREFERRED EMBODIMENTS

Embodiments of the present invention will now be described with reference to the drawings. It is however to be understood that the protective scope of the present invention is not limited to the embodiments shown below, but that it covers up to the invention defined by claims and its equivalents.

Figure 1:
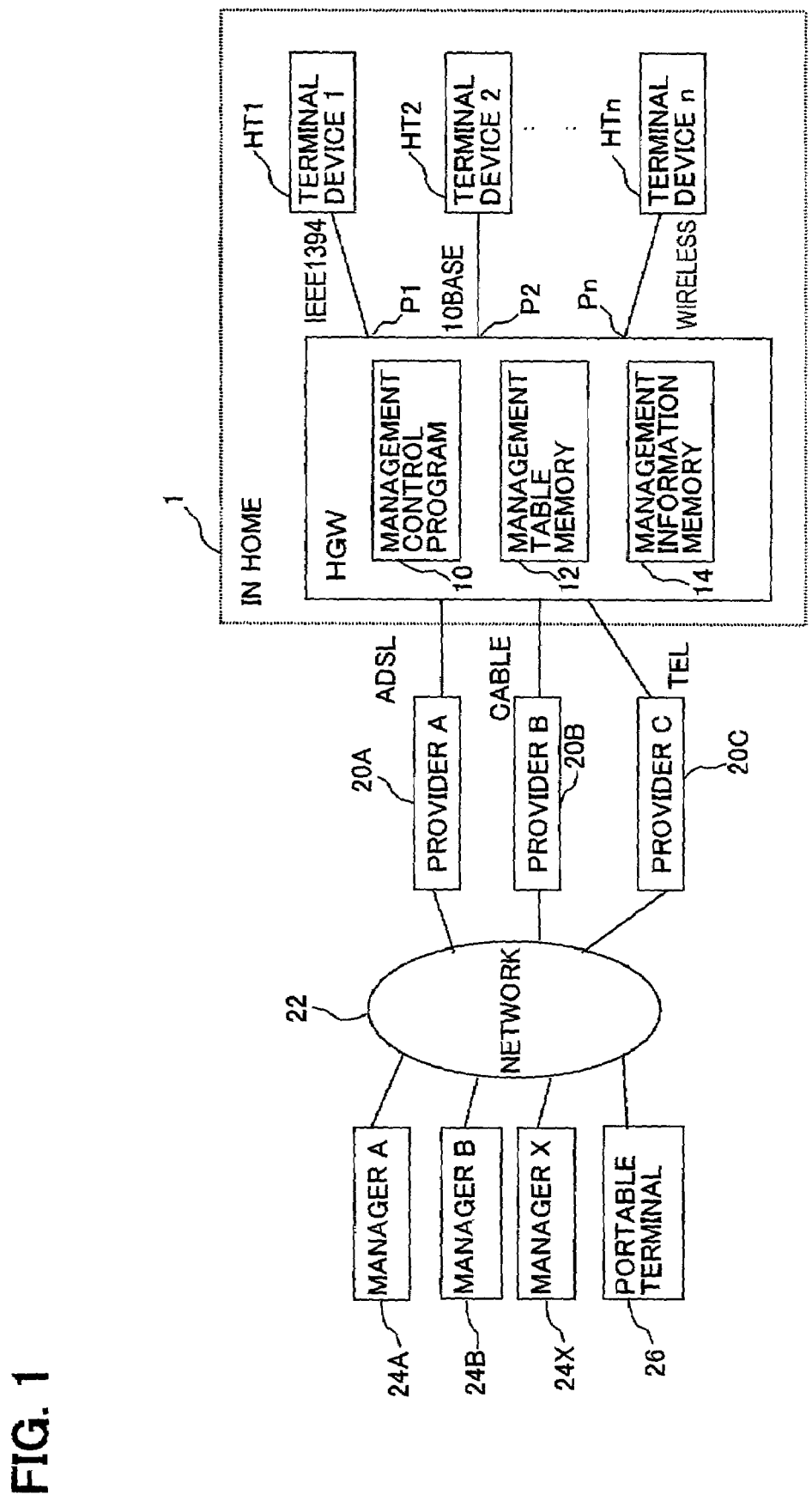
FIG. 1 shows a configuration of an entire system having a home gateway apparatus in an embodiment of the present invention.

FIG. 1 is a configuration drawing of a total system having a home gateway apparatus in the embodiment. In a home 1, a plurality of intra-home terminal devices HT1 through HTn are installed, and connected to a home gateway apparatus HGW, making communication available. The intra-home terminal devices HT1 through HTn are household electrical equipments, for instance, a refrigerator, air conditioner, TV, VCR, microwave oven, security apparatus, personal computer, etc., and these apparatuses have a function to communicate with the home gateway apparatus HGW through a home network, IEEE1394, 10BaseT, wireless LAN, USB, etc.

To the home gateway apparatus HGW, a management information control program 10 to control an acquisition of the management information of each intra-home terminal device and an transmission of the information to the outside is installed, and also ports P1 through Pn to connect for communication with the intra-home terminal devices are provided. Furthermore, the home gateway apparatus HGW has a management table memory 12 which contains at least a management information to be sent of the intra-home terminal devices connected to each of the port and external destination addresses corresponding to the port Nos. P1 through Pn, and for this management table memory 12, the information as described above will be set for every terminal devices. And, the management information acquired from the individual intra-home terminal devices will be stored in the management information memory 14.

The home gateway apparatus can access to an external public or a private network 22, through an external interface, which can be used at home where terminal devices are installed, and its provider 20. The public or private network 22 may be, for instance, the Internet, and the home gateway apparatus HGW can send or receive data with a manager server or manager terminals 24A, 24B and 24X that manages the individual terminal devices HT1 through HTn, through the network 22. Moreover, the home gateway apparatus HGW can also perform data communication to a manager's portable terminal 26.

Here, the management information of an intra-home terminal device is information required for maintenance or repair services of the terminal device, which contains, for instance, trouble information, whether the apparatus is under operation or not, operating time, model name, manufacturing No., etc., and this is the information preferably to be sent to a manager in charge of maintenance work or repair service of each terminal device, periodically or upon requested.

If the intra-home terminal device is a refrigerator, this information may be information concerning foodstuffs stored in the refrigerator, and an external manager can deliver refilling foodstuffs to be additionally stored, according to the foodstuffs information. In the same manner, if the terminal device is a printer, an external manager can re-supply an ink cartridge or printing paper in an appropriate timing, according to the information concerning the total accumulated operating time. That is to say, an external manager can acquire knowledge as the management information as to the replenishing timing of supply goods for the purpose of allowing the intra-home terminal device to operate properly.

In another example, if the terminal device is broken down, a request for the management information sent from the external manager is received by the home gateway apparatus, and in response to the request, the home gateway apparatus will send to the manager the information required for repairing work, including the model name, manufacturing No., or the information on operation history. Instead of the conventional procedure that the user has to call the repair center asking for repair, describing the specific troubled state, by sending the management information including the fact of a trouble taking place, and asking repair, using the home gateway apparatus, it will become possible to automatically communicate the necessary information accurately and on a detailed level to the manager or repair man. Therefore, when a trouble takes place, the trouble will be automatically informed to the external manager, and the necessary trouble information will be sent to the manager, thus repair work will be made by a repairman who visits the site or repairs by remote operation.

As described above, if data communication can be made between the intra-home terminal device and an external manager, the external manager can acquire a variety of management information concerning the terminal device, therefore, the user will be able to enjoy higher value added service from the external manager. Therefore, the management information of the terminal device described in this patent application should be interpreted in a broad sense, including a variety of information relating to the terminal device, so that the user can receive a variety of services from the external manager accordingly.

As described above, depending on the type of services offered by the external manager, the required management information may differ, and the timing of sending the management information may also differ. In a house, a variety of domestic use electrical appliances are installed, and the type of services will differ, depending on the individual function or usage of the installed electrical appliances. Therefore, for the home gateway apparatus which functions as a gateway to the external Internet 22 for these terminal devices, flexibility is required so that the home gateway apparatus can send a variety of information to different managers in different timings.

Moreover, the management information includes the information needed by the home gateway apparatus to perform information processing, in addition to the information needed by the manager. In short, it is the processing information whether the acquired management information should be immediately sent, or should be sent at the preset intervals, or should be sent in response to a request. This processing information differs depending on the information required to be sent, but if the management information includes the processing information, the home gateway apparatus acquiring that information will be able to know what information should be sent in what timing. Therefore, even if all of the processing information concerning what information is to be sent in what timing is not set for the management table, by allowing the management information itself to include the processing information, the terminal device can set the processing information independently from the home gateway apparatus so that the versatility of the home gateway apparatus can be enhanced.

Also, the home gateway apparatus acquires the management information from the intra-home terminal devices, and sends the information to the external manager terminal in a specified timing. However, it is not necessary to acquire all management information in a short cycle and send to the external manager terminal, and otherwise, the burden of the home gateway apparatus can be increased. Therefore, setting is made for the home gateway apparatus so that the acquiring timing and sending timing can differ depending on the individual management information.

Figure 2:
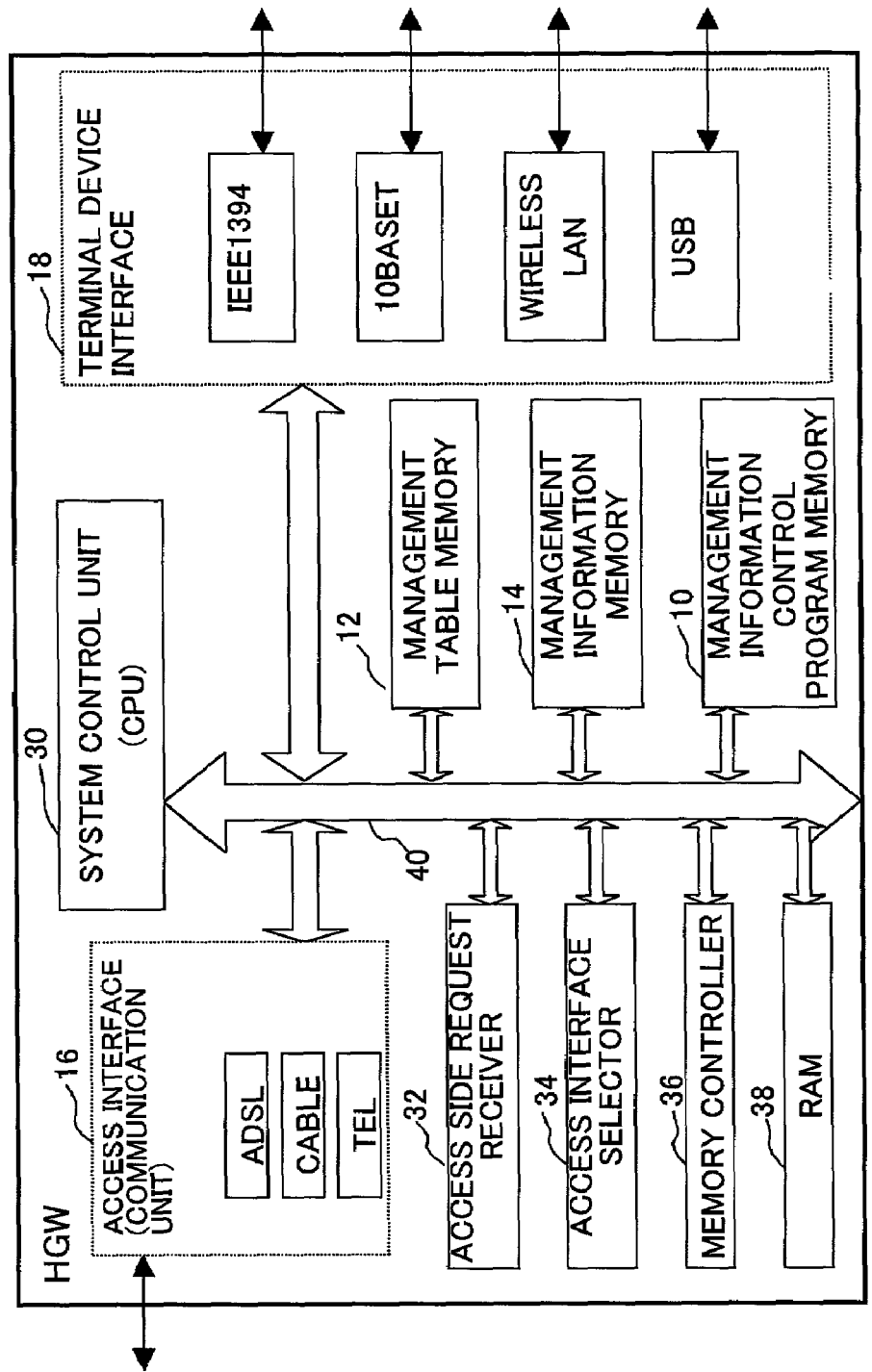
FIG. 2 shows an exemplary configuration of a home gateway apparatus in the embodiment of the present invention.

FIG. 2 shows a configuration example of the home gateway apparatus in the embodiment. The home gateway apparatus HGW is constructed by a one chip system LSI, and all or the major portion, shown in FIG. 2 except a portion of the elements, are provided in one chip. A system control unit 30 functioning a CPU acquires the management information of the intra-home terminal device, by executing a program stored in a management information control program memory 10, and sends the acquired management information to an corresponding external manager through a network 22.

The home gateway apparatus HGW has an internal interface means 18 to the intra-home terminal device connected to the port. The internal interface means 18 includes an interface, for instance, IEEE1394, 10BaseT, wireless LAN, USB, etc. Moreover, the home gateway apparatus HGW has an external interface means 16 to a plurality of external terminals 24 on an external network. The external interface means 16 includes an interface Tel using ISDN or other telephone line, interface Cable using a cable, interface ADSL using ADSL,etc. Preferable interface is the cable or ADSL interface that can be applied to the broadband communication.

It is preferable for the internal interface means 18 and the external interface means 16 to have as many as possible interface means to be ready for a variety of intra-home terminal devices or infrastructure of each home. However, it is difficult for the one chip system LSI to install all interface means, therefore, in that case, it is preferable to provide into the system LSI more widely available interface means only, and to allow an optional LSI outside of the chip to get ready for less widely available interface means.

In the home gateway apparatus HGW, a management table memory 12, a management information memory 14, an access side request receiver unit 32, an access interface selector unit 34, a memory control unit 36, and a memory (RAM) 38 are connected to a system control unit 30, through a system bus 40.

FIG. 3 shows an example of a management table for an intra-home terminal device. The management table is the data to be set in the management table memory 12, by the household installing the home gateway apparatus HGW, and this table includes, corresponding to the port No., the destination address of the management information of the intra-home terminal device connected to the port, the ID and password to get access to an external manager terminal, an external interface, an internal interface, yes or no of sending operation, sending intervals to an external manager terminal (sending timing), intervals of acquiring management information (acquiring timing) and the sending level corresponding to the management information to be sent.

As being made clear from the code list mentioned later, the sending level means the code corresponding to the management information, and this code can specify the management information, and at the same time, it includes the timing information for sending the corresponding management information. In other words, this sending level corresponds to the type of the management information, as well as to the processing information.

In the example shown in FIG. 3, for the terminal device connected to a port No. 1, the destination addresses, [aaa@A.com] and [bbb@B.com] for two external manager terminals are set, and IDs and passwords for access are set respectively. Moreover, an external interface "ADSL" is set for each destination address, and an internal interface "IEEE1394" to the intra-home terminal device is set. In addition, as to both of the two external terminals, "Yes" is set for the sending processing operation, and "every 24 hours" is set for the sending intervals, but as to each of the two external terminals, "every one hour" and "every 30 minutes" are set for the acquiring intervals, respectively, and "1" and "0, 1, 2" are set for the sending level, respectively.

For the terminal device connected to a port No. 2, two destination addresses [ccc@X.com] and telephone No. [090-1234-5678] for the cellular phone terminal are set, and for the manager terminal [ccc@X.com], an ID and a password for access are set. Also, individual external interfaces and internal interfaces are set. For the manager terminal [ccc@X.com], the setting is made so that the management information at the sending level "0, 1" is to be acquired at the acquiring intervals of "every 10 minutes", and also "every 12 hours" is set for the sending intervals, and "Yes" is set for the sending processing. In addition, for the manager cellular phone terminal "090-1234-5678", "No" is set for the sending processing, therefore, any setting is not made as to the acquiring interval and sending interval. However, as "2" is set for the sending level, setting is made so that when a request is delivered from the manager cellular phone terminal, the corresponding management information can be acquired and sent in real time.

As described above, for all the intra-home terminal devices to be connected to the home gateway apparatus HGW, a management table is set corresponding to the port No. And this setting of the management table is made automatically in a plug-and-play manner, by the initial setting operation when the home gateway apparatus is first connected to the intra-home terminal device. For instance, the setting information may be acquired from the intra-home terminal device, or may be acquired from the service web site of the maker of the intra-home terminal device through the Internet. Also, the user of the home gateway apparatus is allowed to freely change the initially set value later. Therefore, it is possible for the user to freely change and set the sending timing of the management information, so as to send the management information in the user's desired timing.

FIG. 4 is a chart showing an example of a code list. If the home gateway apparatus is to acquire the management information of the intra-home terminal device through the home network, and to send the acquired information to the external manager terminal, the data amount must be reduced. Because if the data amount is large, the burden of the intra-home terminal device will be increased, thereby resulting in increased cost of the domestic use electrical appliances, as well as the burden of the home gateway apparatus will be increased and communication cost will be up. Therefore, in the embodiment of the present invention, the management information is encoded to reduce the sending data amount.

In an example shown in FIG. 4, set are (1) correspondence between the model information of the intra-home terminal device and code, (2) correspondence between the sending level showing the sending processing and code, (3) correspondence between the state of the terminal device or requested information and code, and (4) units of the additional information to be added to the state/request. This correspondence chart differs depending on each intra-home terminal device, and the terminal device and the external manager will encode the management information according to the same correspondence chart, and send/receive the encoded management information.

In the example shown in FIG. 4, code "1" is allocated to a personal computer PC, and as to the sending level, to the "level for immediate sending", code "1", to the "level for sending at the set sending intervals", code "1", to the "level for sending when requested by manager", code "2" are allocated, respectively.

Moreover, the sending level specifies the "state/request information" which is the management information. In the example shown in FIG. 4, the state/request information of the sending level "0" of the personal computer PC includes "hard disk error", "memory error" and "other errors", and to these contents, code "0", "1" or "2" is allocated, respectively. Also, the state/request information of the sending level "1" includes "under normal running", "accumulative use time" and "continuous use time", and to these contents, code "0", "1" or "2" is allocated, respectively. In addition, to the "accumulative use time" and the "continuous use time", actual time data is added as the additional information, and the scale of the actual time data is determined "hours H" before hand. Furthermore, the state/request information of the sending level "2" includes "serial No.", "model name/number", and "resource state", and to these contents, code "0", "1" or "2" is allocated, respectively. It is previously determined that additional information is to be added to these, too.

Further, to the microwave oven, code "2" is allocated, and as to its sending level, like the case of the personal computer, to the "immediate sending", "sending at set sending intervals", and "sending when requested", code "0", "1" and "2" are allocated, respectively. The state/request information, which is the management information corresponding, to the sending level "0" includes "temperature abnormal", "voltage abnormal" and "other errors", and to these contents, code "0", "1" and "2" are allocated, respectively. The state/request information to the sending levels "1" and "2" is the same as in the case of the personal computer.

Also to the TV, code "3" is allocated, and the state/request information to the sending level "0" of "immediate sending" includes "display error", "sensor abnormal", and "temperature abnormal", and codes "0", "1" and "2" are allocated respectively. In the case of the sending levels "1" and "2", although not shown in the drawing, the information is the same as in the case of the personal computer.

FIG. 5 shows an example of the management information acquired by the home gateway apparatus and stored in the management information memory 14. The system control unit 30 to execute the management information control program 10 refers to the management table 12, and acquires the management information of the terminal device connected to each port, through the home network. As the result, in the example shown in FIG. 5, the management information for the terminal device connected to the port No. "1" and the destination "1" is acquired.

According to the management information table shown in FIG. 3, for the terminal device connected to the port No. "1" and the destination "1", the state/request information corresponding to the sending level code "1" (send at set sending intervals) should be acquired once every one hour through the home network IEEE1394. Accordingly, the system control unit 30 accesses to the terminal device connected to the port No. 1 through the internal interface at the acquiring intervals as described above, and requests the state/request information corresponding to the sending level "1" and its additional information. Responding to the request, the terminal device HT1 sends the state/request information allocated to the sending level "1" to the home gateway apparatus, together with the model code and sending level code.

Accordingly, as shown in FIG. 5, at the acquired times "2001/1/25, 17:00" and "2001/1/25, 18:00", the state request codes "0", "1" and "2", and their additional information are acquired, and stored in the management information memory 14, together with the corresponding model code "1" and the sending level code "1".

In the same manner, as to the management information for the destination "2" of the terminal device for the port No. "1", setting is made so that the state/request information for the sending levels "0", "1" and "2" is to be acquired once every 30 minutes, as referred to the management table shown in FIG. 3. Therefore, the system control unit 30 for the home gateway apparatus requests the terminal device for the state/request information corresponding to the sending levels "1", "1" and "2" and its additional information once every 30 minutes, and the terminal device sends back the state/request information to the home gateway apparatus, together with the model code and the sending level code. And there turned management information will be stored in the management information memory 14.

As shown in the example of FIG. 5, as to the sending level "1", code "0" representing the normal running, the cumulative use time "101101.5H", and the continuous use time "6.5H" have been acquired at the acquiring date "2001/1/25, 18:30", and as to the sending level "0", the state request code "0" indicating a hard disk error has been acquired.

Similarly, as to the terminal devices connected to the port Nos. 2 or above, the model code, sending level code, state request code and additional information for every destination are acquired at every acquiring time set in the management table, and stored in the management information memory 14.

The acquired management information as shown in FIG. 5 will be sent to an external manager terminal, according to the sending level code, destination code, which are the processing information contained in the management information, and also according to the sending processing and sending intervals set in the management table.

For instance, according to the management table, the management information for the terminal device connected to the port No. "1" will be sent to the address [aaa@A.com] of the destination "1" through the external interface ADSL at the sending intervals of once every 24 hours. At this time, the ID and password for accessing to the external manager terminal are used, so that the external manager terminal can identify the access source, i.e., which home gateway apparatus in which home accesses. And the management information to be sent at the time of access includes the model code, sending level code, state request code and additional information, and the external manager terminal can specify which state request information of which model, from the code allocation chart shown in FIG. 4.

In addition, out of the management information for the terminal device connected to the port No. "1", the management information to be sent to the address [bbb@B.com] of the destination "2" will be sent to the external manager terminal immediately after receipt, if the sending level is "0", or, the management information will be sent at the sending intervals (once every 24 hours) set in the management table, if the sending level is "1". Further, as to the sending level "2", the management information acquired when requested from an external manager terminal will be sent immediately.

As described above, the sending level information is the information allocated to the management information acquired from the terminal device, and also the information indicating the type of sending processing concerning the sending timing. That is to say, as the degree of urgency of sending to the external manager terminal differs depending on each management information, if the management information is set in advance, corresponding to each sending level, the sending level information will be able to specify the management information that should be acquired, and also be able to specify the type of sending processing. And, if the sending level information will be included in the management information and stored in the management information memory, then, the home gateway apparatus will be able to specify the type of sending processing, referring to the sending level contained in the acquired management information. Therefore, the home gateway apparatus will be able to be ready for the individual management types of the intra-home terminal devices flexibly.

Figure 6:
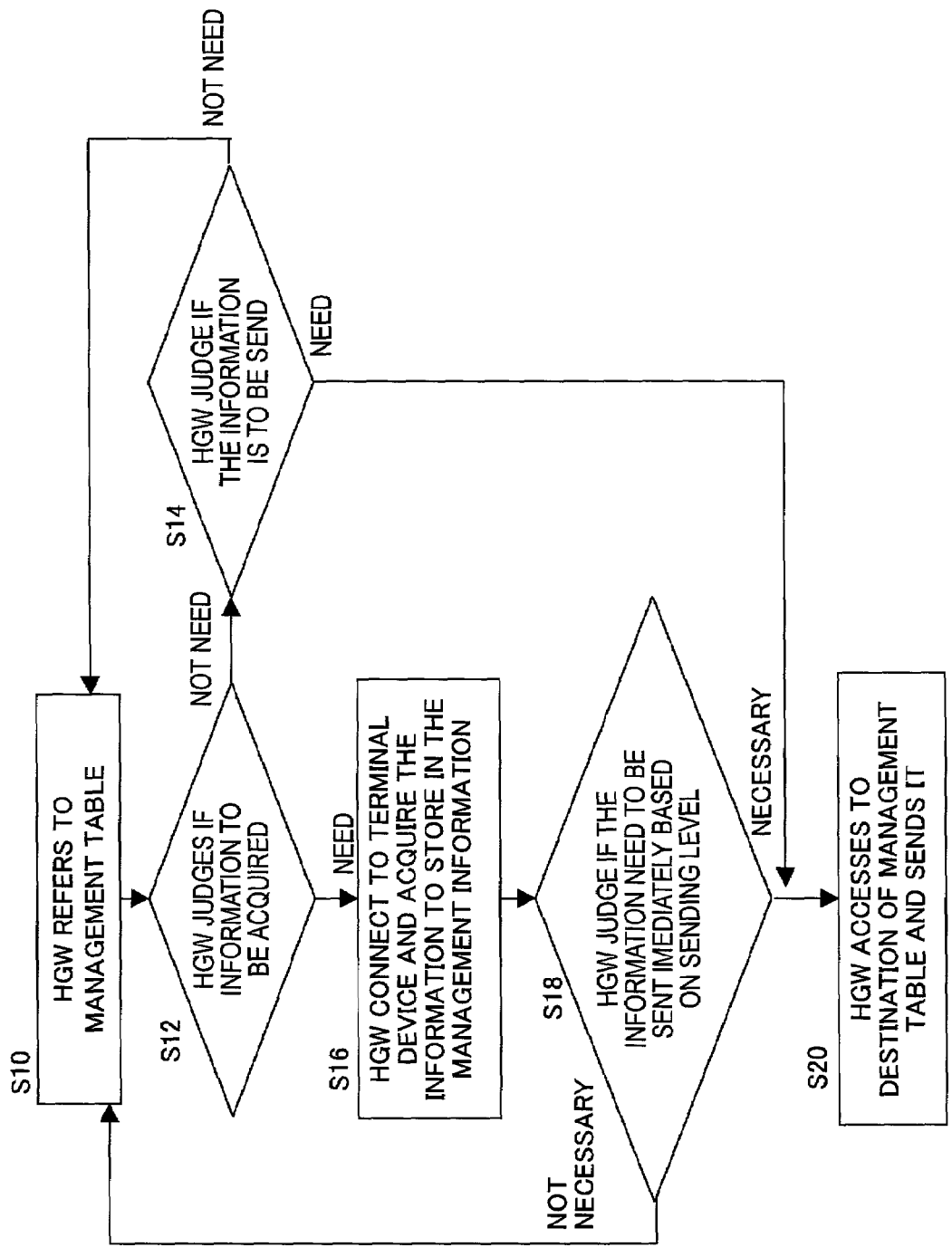
FIG. 6 is a flowchart for acquiring management information corresponding to the sending levels "0" and "1", and sending processing.

FIG. 6 shows a flowchart of acquiring the management information and processing of sending corresponding to the sending levels "0" and "1",. Acquiring the management information and processing of sending are performed by the system control unit 30 in the home gateway apparatus, by executing the management information control program 10, referring to the management table 12.

First of all, the system control unit 30 refers to a management table 12 in the home gateway apparatus HGW (S10), and judges whether acquiring of the management information is necessary or not (S12). This judgment is made for every terminal device for the port No., and also according to the acquiring intervals set for every destination. If the management information should be acquired, the home gateway apparatus HGW will connect to the corresponding terminal device, according to the internal interface, referring to the management table, and will acquire the management information corresponding to the sending level and store the acquired information in the management information memory 14 (S16).

And then, the home gateway apparatus determines whether immediate sending is necessary or not, depending on the sending level contained in the management information (S18), and if the management information is the information that must be sent at the preset sending intervals, like in the case of the sending level "1" the home gateway apparatus will wait until that sending timing comes. If the state is abnormal like in the case of the sending level "0", or in the case of emergency, the home gateway apparatus will immediately access to the destination and send the management information (S20).

In addition, as to the management information for the sending level "1" stored in the management information memory 14, when the sending timing set in the management table comes (S14), the home gateway apparatus accesses to the external manager terminal according to the external interface, referring to the address stored in the management table, and sends the management information to the external manager terminal.

Figure 7:
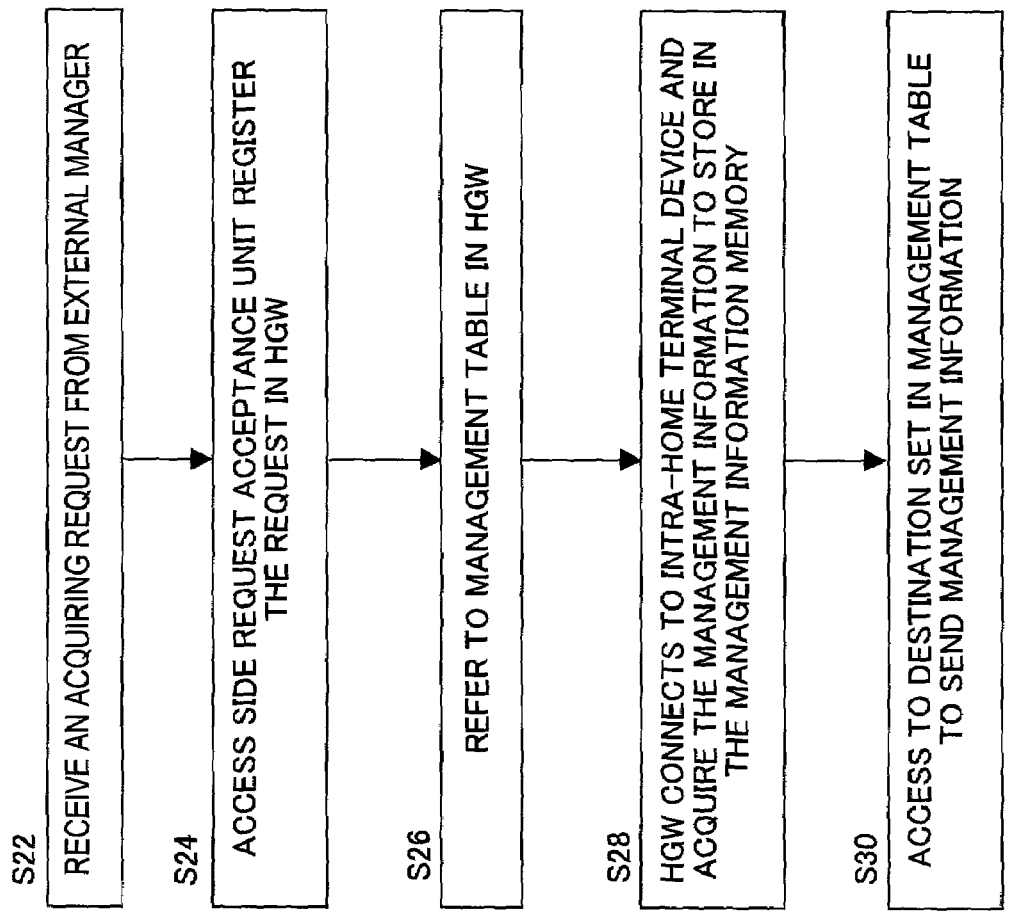
FIG. 7 is a flowchart for acquiring and sending management information corresponding to the sending level "2".

FIG. 7 is a flowchart of acquiring and sending of the management information for the sending level "2". The management information for the sending level "2" is not required to be sent to the external manager, if in the normal state, but, that is the information to be acquired and sent, in response to a request by the external manager at the time of initialization or at the time of trouble.

As shown in FIG. 7, when receiving an acquiring request from the external manager (S22), the home gateway apparatus performs processing to register an acceptance at an access side request acceptance unit 32 (S24). This acquiring request includes the connection port No. for the intra-home terminal device, whose information is to be acquired. And, referring to the management table, the home gateway apparatus acquires the state/request information for the sending level "0", connecting to the corresponding intra-home terminal device, from the connection port No., and stores the acquired information in the management memory (S28). Further, the home gateway apparatus immediately sends the management information to the external manager terminal, the destination, according to the sending level "0" contained in the management information (S30). The destination address, the external interface, etc. will be acquired by reference to the management table.

An acquiring request from an external manager is not always made from the external manager of the destination address. In response to an acquiring request from an external manager of a certain address, the acquired requested information with sending level "0" is sent to the destination address set in the management table.

In this embodiment of the present invention, the management information control program shown in FIGS. 6 and 7 is normally a firmware imbedded in a ROM, and this management information control program is used by a plurality of the intra-home terminal devices in common. In other words, the home gateway apparatus acquires and sends the management information, using a single management protocol, for different intra-home terminal devices. By this function, cost can be prevented from increasing caused by the employment of different management program for every intra-home terminal device, and even for intra-home terminal devices to be developed in the future, it will become possible to acquire and send the management information. Thus, versatility of the home gateway apparatus can be enhanced.

According to the present invention, since the home gateway apparatus has a management table memory storing sending destination addresses and management information to be sent according to port numbers, the home gateway apparatus can send an appropriate management information to an appropriate external management terminal for each intra-home appliance in home, by setting the management information and the sending destination addresses in the management table memory for each home appliance installed in home. Therefore, a common home gateway apparatus can manage the sending the management information of different home appliances from different vender.

What is claimed is:

1. A home gateway apparatus connected via ports to a plurality of intra-home terminal devices installed in a home network, the home gateway apparatus comprising:
an external interface unit to a plurality of external terminals on an external network;
an internal interface unit to the plurality of intra-home terminal devices on the home network;
a management table memory for storing, corresponding to port numbers, at least target management information and a sending destination address of the intra-home terminal devices connected to the ports;
a management information memory for storing, corresponding to the port numbers and the sending destination addresses, the management information of the intra-home terminal device acquired from the intra-home terminal device, based on a management table stored in the management table memory; and
a management information control unit for acquiring the management information of the intra-home terminal device connected to each port to store the acquired management information in the management information memory, according to the target management information stored in the management table, and sending a specified management information to the external terminal, according to the sending destination address stored in the management table.

2. The home gateway apparatus according to claim 1, wherein
the management table memory stores, corresponding to the port numbers, external interface information for getting access to the external terminal, and internal interface information for connecting to the intra-home terminal device.

3. The home gateway apparatus according to claim 1, wherein
the management table memory stores, corresponding to the port numbers, timing information for acquiring the management information from the intra-home terminal device.

4. The home gateway apparatus according to claim 3, wherein
the timing information for acquiring differs depending on the management information to be acquired and/or the external terminal to be sent.

5. The home gateway apparatus according to claim 1, wherein
the management table memory stores, corresponding to the port numbers, timing information for sending the acquired management information to the external terminal.

6. The home gateway apparatus according to claim 5, wherein
the timing information for sending differs depending on the acquired management information and/or the external terminal to be sent.

7. The home gateway apparatus according to claim 5, wherein
the timing information for sending in the management table is capable of being changed or set optionally.

8. The home gateway apparatus according to claim 1, wherein
the apparatus acquires and sends the management information of the intra-home terminal device, in response to a management information acquiring request from the external terminal.

9. The home gateway apparatus according to claim 1, wherein
the management table memory includes a plurality of sending destination addresses set for one port number.

10. The home gateway apparatus according to claim 1, wherein
the management information includes model information of the intra-home terminal device, sending level information indicative of a sending mode, and state information of the intra-home terminal device, and wherein the management information control unit sends the management information to the sending destination address in the management table, depending on the sending level information.

11. The home gateway apparatus according to claim 1, wherein
the management information includes model information of the intra-home terminal device, sending level information indicative of a sending mode, and state information of the intra-home terminal device, and wherein
the model information, the sending level information and the state information are encoded, the codes are acquired and sent as the management information.

12. The home gateway apparatus according to claim 1, wherein
a management protocol of the management information control unit is common to different intra-home terminal devices.

13. The home gateway apparatus according to claim 1, wherein
the management table sets a plurality of sending destination addresses for one intra-home terminal device.

14. The home gateway apparatus according to claim 1, wherein
depending on the management information and the sending destination address, the timing for acquiring the management information differs and the timing for sending the management information also differs.

15. A home gateway apparatus connected via ports to a plurality of intra-home terminal devices installed in a home network, the home gateway apparatus comprising:
an external interface unit to a plurality of external terminals on an external network;
an internal interface unit to the plurality of intra-home terminal devices on the home network;
a management table memory for storing, corresponding to port numbers, at least target management information and a sending destination address of the intra-home terminal devices connected to the ports;
a management information memory for storing, corresponding to the port numbers and the sending destination addresses, the management information of the intra-home terminal device acquired from the intra-home terminal device, based on a management table stored in the management table memory; and
a management information control unit for acquiring the management information of the intra-home terminal device connected to each port to store the acquired management information in the management information memory, according to the target management information stored in the management table, and sending a specified management information to the external terminal, according to the sending destination address stored in the management table, wherein
the management information memory stores sending level information indicative of sending timing, together with the management information, and the management information control unit sends the management information in accordance with the sending level information.

* * * * *